United States Patent
Eiserer

(10) Patent No.: US 10,470,367 B2
(45) Date of Patent: Nov. 12, 2019

(54) CUTTING WEB

(71) Applicant: Rex A. Eiserer, Austin, TX (US)

(72) Inventor: Rex A. Eiserer, Austin, TX (US)

( * ) Notice: Subject to any disclaimer, the term of this patent is extended or adjusted under 35 U.S.C. 154(b) by 0 days.

(21) Appl. No.: 15/901,010

(22) Filed: Feb. 21, 2018

(65) Prior Publication Data
US 2018/0235145 A1    Aug. 23, 2018

Related U.S. Application Data

(60) Provisional application No. 62/462,649, filed on Feb. 23, 2017.

(51) Int. Cl.
| | | |
|---|---|---|
| *A01D 42/00* | (2006.01) | |
| *A01D 34/416* | (2006.01) | |
| *A01D 34/84* | (2006.01) | |
| *A01D 42/04* | (2006.01) | |
| *A01D 42/06* | (2006.01) | |
| *A01B 1/06* | (2006.01) | |
| *A01D 34/73* | (2006.01) | |
| *A01G 20/47* | (2018.01) | |

(52) U.S. Cl.
CPC .............. *A01D 42/00* (2013.01); *A01B 1/065* (2013.01); *A01D 34/416* (2013.01); *A01D 34/4165* (2013.01); *A01D 34/4168* (2013.01); *A01D 34/733* (2013.01); *A01D 34/84* (2013.01); *A01D 42/04* (2013.01); *A01D 42/06* (2013.01); *A01G 20/47* (2018.02)

(58) Field of Classification Search
CPC .......................... A01D 34/416; A01D 34/4168
USPC .............................................. 56/295; 30/276
See application file for complete search history.

(56) References Cited

U.S. PATENT DOCUMENTS

| | | | | |
|---|---|---|---|---|
| 5,862,598 A | * | 1/1999 | Lee ..................... | A01D 34/4168 30/276 |
| 6,176,015 B1 | * | 1/2001 | Morabit .............. | A01D 34/4168 30/276 |
| 6,446,346 B1 | * | 9/2002 | Castleman ........... | A01D 34/416 30/276 |
| 8,046,981 B2 | * | 11/2011 | Pugh ....................... | A01B 1/00 239/289 |
| 8,640,588 B2 | * | 2/2014 | Strader ................. | A01D 34/733 30/276 |
| 2003/0037442 A1 | * | 2/2003 | Lyon .................... | A01D 34/416 30/276 |
| 2007/0028459 A1 | * | 2/2007 | Thomson ........... | A01D 34/4168 30/276 |

(Continued)

*Primary Examiner* — Laura M Lee
(74) *Attorney, Agent, or Firm* — Sprinkle IP Law Group

(57) ABSTRACT

Systems and methods for cutting grass and other materials using a disk-shaped cutting web are disclosed. The cutting web has a center portion that is attachable to a rotating shaft adapter. The center portion may be a solid annular disk having a keyed aperture that allows it to be mounted on a spindle of a rotating shaft adapter. The cutting web has multiple strings that are connected to the center portion and extend outward from it in a generally radial direction (away from the center of the disk). The strings intersect with each other to form junctions at which they are joined, thereby forming a web that can be rotated at high speed to perform a cutting function. The strings of the web can have sharp or serrated edges and may be colored to increase the visibility of the web.

16 Claims, 5 Drawing Sheets

(56) References Cited

U.S. PATENT DOCUMENTS

| | | | | |
|---|---|---|---|---|
| 2015/0359172 A1* | 12/2015 | Nelson | ............... | A01D 34/733 30/276 |
| 2018/0235147 A1* | 8/2018 | Eiserer | ............... | A01D 42/00 |

* cited by examiner

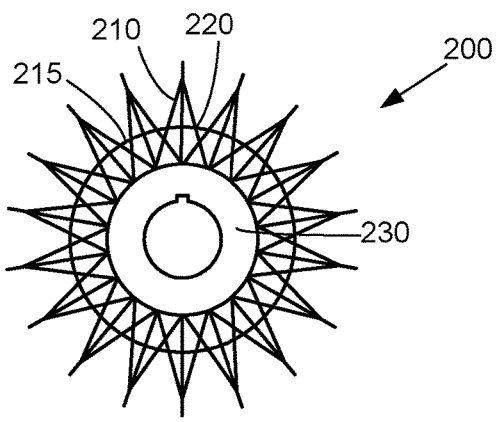
Fig. 2A
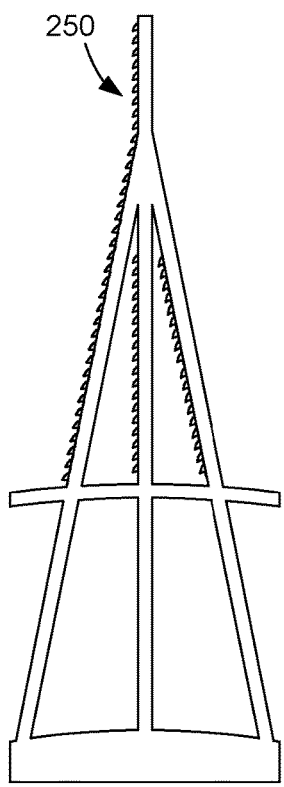
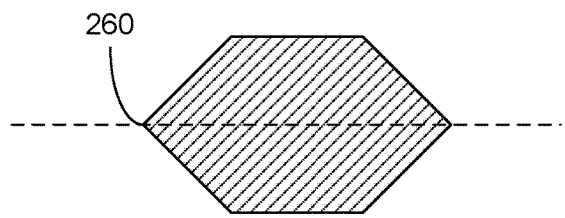
Fig. 2C
Fig. 2B

CUTTING WEB

CROSS-REFERENCE TO RELATED APPLICATIONS

This application claims the benefit of U.S. Provisional Patent Application 62/462,649, filed Feb. 23, 2017 by Rex A. Eiserer, which is incorporated by reference as if set forth herein in its entirety.

BACKGROUND

Field of the Invention

The invention relates generally to tools and more particularly to systems and methods for cutting, trimming or edging grass, weeds and other materials using a web of interconnected strings that can be connected to a rotating adapter that forms a hub similar that of a string trimmer.

Related Art

Conventional string trimmers are systems simply composed of a motor, a shaft, a hub or drum, and a cutting media generally composed of strings. The motor is attached to a shaft at one end and spins the hub/drum mounted at the other end of the shaft. Strings attached to the hub/drum are spun at high speed in order to cut or trim grass and weeds. Descriptions of prior art string trimmers can be found, for example, in U.S. Pat. Nos. 5,901,448 and 6,944,956.

Most string trimmers use one or two strings but some models use three or more strings as more strings infer more cutting capability. During the cutting process, the strings tend to wear down and/or break and require replacement. Replacing the strings is done by two means. The first means is completely stopping the hub/drum and replacing the entire string(s) with new ones. These new strings are sections of strings that are already cut to a specified length and are held in place by various means. This method requires a replacement every time a string breaks or wears down and is time consuming to replace. The second method of replacement is by unwinding a single long string from the hub, which forms a drum or spool on which the string is wound. Some hubs have multiple strings that unwind simultaneously. The unwinding can be done manually when the drum is stopped or automatically though the "bump" method which allows the drum to unwind a predetermined amount of string during operation. Either way, the drum must be pre-wound with string prior to using the string trimmer which is time consuming and frustrating.

SUMMARY OF THE INVENTION

This disclosure is directed to systems and methods for cutting or edging grass and other materials that solve one or more of the problems discussed above. One embodiment comprises a disk-shaped cutting web. The cutting web has a center portion that is attachable to a rotating shaft adapter. For instance, the center portion may be a solid annular disk having an aperture through it that allows it to be mounted on a spindle that extends outward from a mounting flange of the shaft adapter. The cutting web has multiple strings that are connected to the center portion and extend outward from it in a generally radial direction (away from the center of the disk). The strings intersect with each other to form junctions at which they are joined together. Together, the strings form a web that can be rotated at high speed so that the outer portion of the strings (at the periphery of the disk-shaped web) perform a cutting function. The cutting web is preferably flexible, rather than rigid.

In one embodiment, the strings may be formed of plastic, and may be integrally formed with the annular disk that is the center portion of the cutting web. The plastic strings and/or center portion may be injection molded, stamped or cut from sheets, or formed in any other suitable manner. In another embodiment, the strings may be formed of metal, such as wire. Alternatively, the strings and the center portion of the cutting web may be integrally formed from sheet metal by stamping, laser cutting or other suitable means. The strings of the cutting web may be formed with a sharp edge (a sharp corner when viewed in cross-section), where the sharp edge is substantially aligned with the plane of the disk-shaped web and is facing the direction in which the web is rotating. The strings may also have serrations or teeth on this leading edge. The teeth may be somewhat hooked, similar to the teeth of a saw blade. Additionally, the sharp edges and serrations may be provided on both sides of the strings so that the cutting web can cut equally well when rotated in either direction. Alternatively, the cutting web can be flipped over (mounted on its reverse side) so that the opposite sides of the strings become the cutting edge when the when the shaft rotates in the same direction. The strings of the cutting web have various features to make the web more visible when it is in use. The presence of multiple strings, rather than the one or two strings that are found in conventional string trimmers, will make the web more visible to a user as it spins, allowing the user to more accurately determine the position of the cutting edge (the periphery of the web) and consequently more accurately cut with the web. The cutting web may also include annular regions of different colors to allow the user to determine the amount of wear of the web when it is in use.

An alternative embodiment comprises an apparatus having a motor, a rotating shaft coupled to the motor, a shaft adapter coupled to the rotating shaft. The motor rotates the shaft, which in turn rotates the shaft adapter and the cutting web. When the shaft adapter and the disk-shaped cutting web are rotated by the motor and shaft, an outer portion of the strings (at a periphery of the disk-shaped cutting web) perform a cutting function.

Numerous other embodiments are also possible.

BRIEF DESCRIPTION OF THE DRAWINGS

Other objects and advantages of the invention may become apparent upon reading the following detailed description and upon reference to the accompanying drawings.

FIGS. 2A-2C are diagrams illustrating a web cutter attachment for a multi-use tool in accordance with one embodiment.

Figure 1:
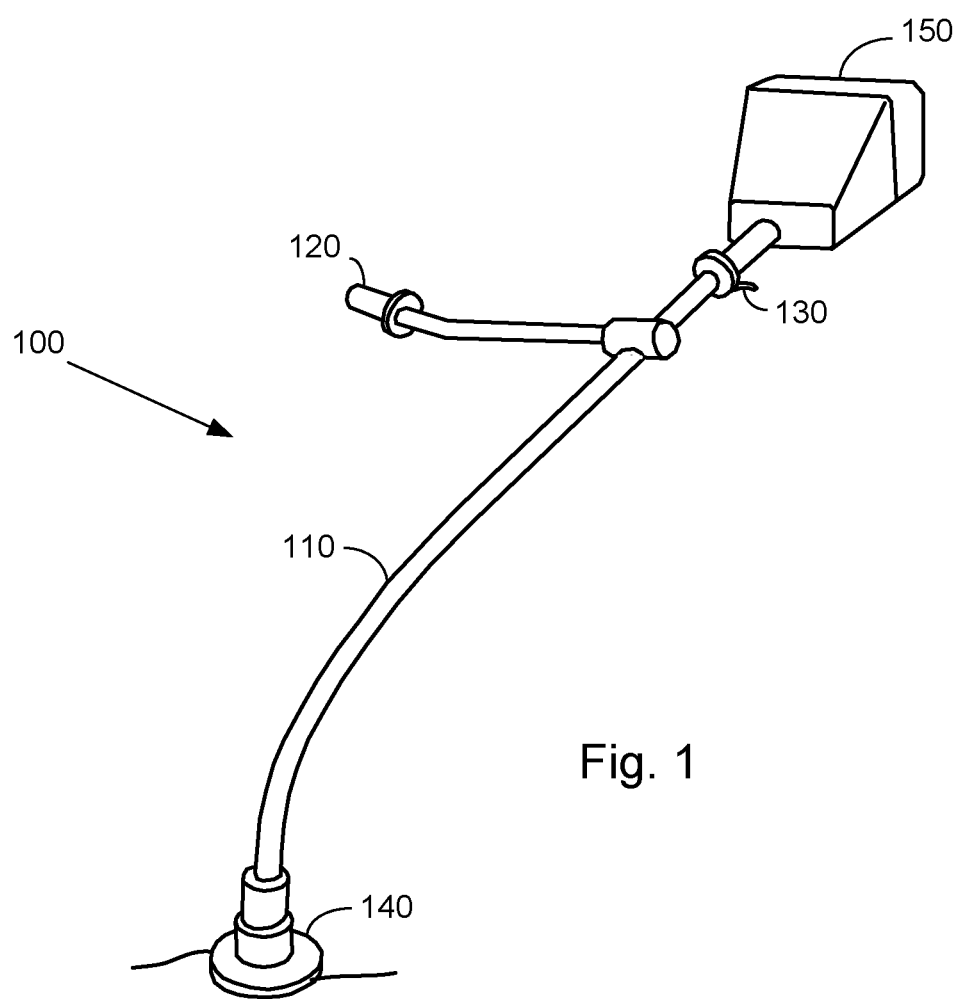
FIG. 1 is a diagram illustrating a string-trimmer-type tool in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

This disclosure is directed to systems and methods that solve one or more of the problems discussed above. In one particular embodiment (see FIG. 1), a tool 100 has a shaft 110 with a handle 120 and operator controls 130 at a first end and a powered rotating shaft adapter 140 at the second end. A string trimmer attachment or various other interchangeable attachments can be secured to the adapter.

Shaft 110 has a rigid tubular outer shaft with a flexible inner shaft that extends from the motor 150 to the shaft adapter 140. The inner shaft rotates within the outer shaft so that the motor can drive the shaft adapter. Shaft 110 thereby forms an extension member that allows the cutting attachment (or other attachment) to be positioned near the ground, while the motor and user controls are more conveniently positioned at the level of the user's hand/arm. While the shaft adapter is driven by a motor at the upper end of the shaft in this embodiment, alternative embodiments may have a motor positioned at the lower end of the shaft. For example, an electric motor may be positioned at the lower end of the shaft while still allowing the user to operate the motor using controls and a power source at the upper end of the shaft. The shaft adapter has a universal mounting flange that is designed to allow any of several attachments to be secured to the shaft adapter so that they are driven by rotation of the shaft adapter. One attachment is a trimmer attachment that is similar to the head of a string trimmer. The shaft adapter's mounting flange is specially designed to allow the use of interchangeable attachments, such as a string trimmer head.

One attachment uses a novel cutting media that cuts more effectively than a typical string trimmer head and allows the cutting media to be replaced more quickly and easily than a typical string trimmer head. The cutting media in this embodiment can be described as a web of strings that is attached to and detached from the mounting flange of the shaft adapter as a single unit. The strings may be plastic, metal (wire) or any other suitable material. An example of a cutting web 200 is illustrated in FIGS. 2A-2C. FIG. 2A shows the overall structure of the cutting web in one embodiment. FIG. 2B shows the structure of a portion of the cutting web in more detail. FIG. 2C shows a cross-sectional structure of an individual string of the cutting web in one embodiment (the cross-sectional structure may be different in other embodiments).

The web can be simply 'snapped' onto the mounting flange or held in place by a cap or other similar mechanism. In the embodiment of FIG. 2A, multiple strings (e.g., 210) are connected to a center portion (230) that is attached to the mounting flange of the shaft adapter. These strings extend outward from the center portion in a generally radial direction (away from the axis around which the adapter rotates) to form the generally disk-shaped web. The strings intersect with each other and are joined at several points or junctions (e.g., 220) so that they hold each other in place as the web rotates. The portions of the strings at the outer periphery of the web perform the cutting. As this web wears down and the strings at the periphery break, some of the junctions near the periphery also break, so that portions of the strings that are then at the periphery of the web are freed from each other and begin to perform the cutting function. When the web is worn down enough that the inner strings can no longer effectively cut, the worn web is simply replaced with a new web.

In one embodiment, center portion 230 may slide over a spindle portion of the mounting flange and may be held in place by a cap that is placed over the center portion and secured to the spindle. Additionally, there could be anti-slip features such a dowels, pins, keyways, etc. built into the mounting flange and disk to keep the disk from rotating on the mounting flange during use. While this embodiment uses a screw cap to secure the disk on the mounting flange, there are numerous other ways to secure the desk to the mounting flange including snapping it on, securing it with screws/bolts, or other means. Additional features include mechanisms to prevent the securing mechanism from backing off and letting the disk slip off.

Referring to FIG. 2B, one "arm" of the cutting web is shown in more detail. In this embodiment, one or more edges of the strings are serrated. The serrations or teeth may have various forms. In one embodiment, the serrations may be simple variations from a straight edge. As depicted in FIG. 2B, the teeth are slightly hooked inward (toward the center of the cutting web) like those of a saw blade so that they effectively tear through the grass or other materials being cut by the web, rather than simply hitting and breaking them. The teeth may be formed on all or only portion of the strings, and may be formed on one side (as shown in the figure) or both sides (so that they can cut when the web is rotated in either direction. Referring to FIG. 2C, the individual strings of the cutting web may be formed so that the cross-section has sharp corners (e.g., 260) on their leading and trailing edges (the direction of travel of the strings is indicated by the dashed line). The sharp corners help the strings to cut through the grass or other materials rather than simply breaking them.

Figure 3A:
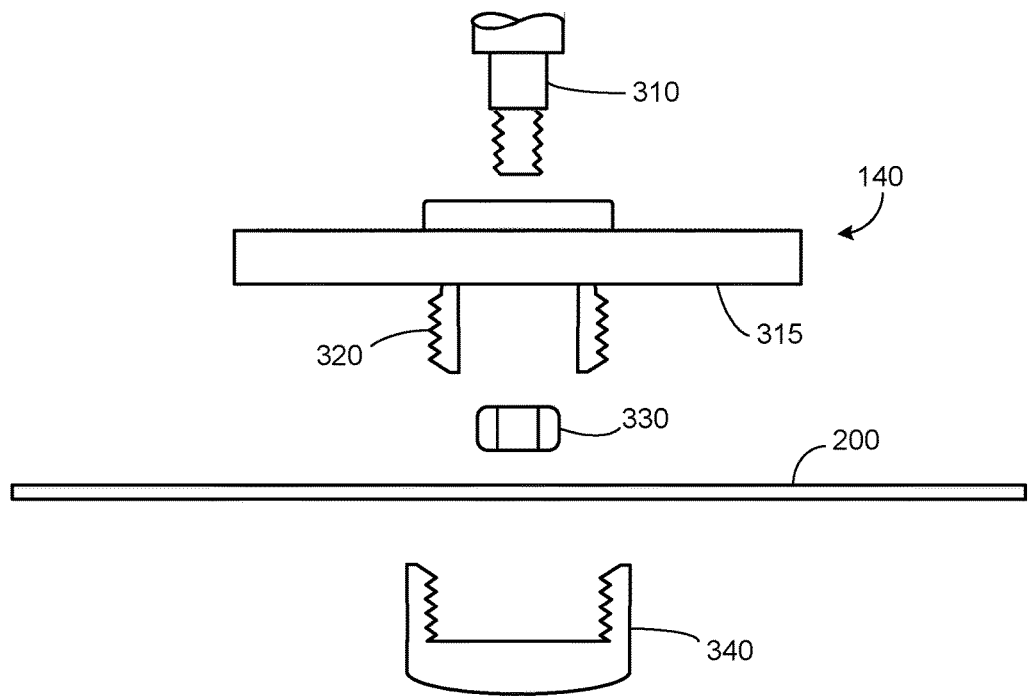
FIGS. 3A-3C are diagrams illustrating the shaft adapter of a multi-use tool in accordance with several embodiments.
Figure 3B:
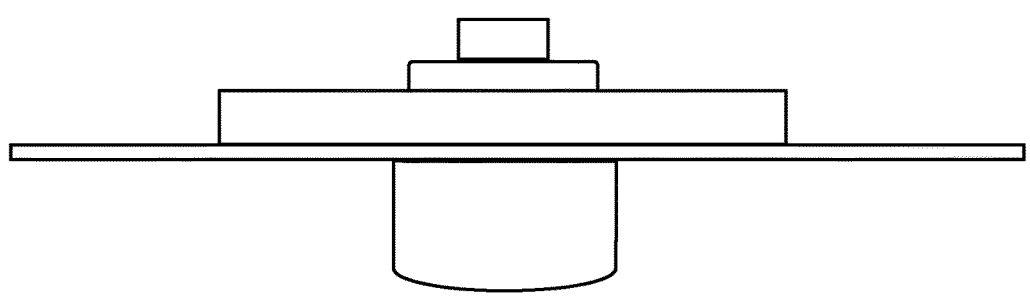

The attachment mechanism used in one embodiment to secure the cutting web to the shaft adapter is illustrated in FIGS. 3A and 3B. FIG. 3A shows the components in a disassembled state, while FIG. 3B shows the components when they are assembled. As depicted in this figure, shaft adapter 140 is attached to the end of a shaft 310 of the tool, and is secured by a nut 330. In one embodiment, shaft adapter 140 may be retrofitted onto a trimmer by attaching this adapter to the original head of the trimmer (which holds the drum around which the trimming string is wound). Shaft 310 is coupled to the tool's motor, which drives the rotary motion of the shaft. Shaft adapter 140 has a mounting flange 315 and a spindle 320 that extends downward, away from the shaft end. Cutting web 200 is positioned over the spindle, against the flat body of mounting flange 315, and a retainer cap 340 is screwed onto (or otherwise secured to) the spindle to hold the cutting web in position on the shaft adapter.

Figure 3C:
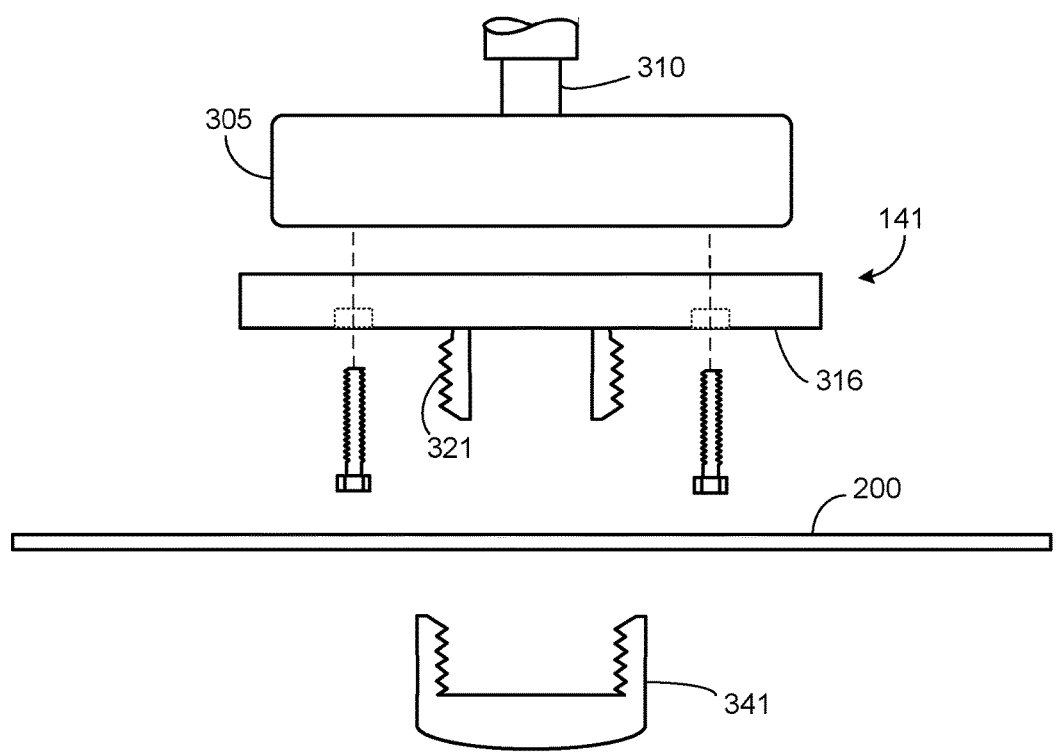

Referring to FIG. 3C, the structure of a shaft adapter in an alternative embodiment is shown. In this embodiment, shaft adapter 141 is configured to be attached to the hub/drum 305 of a string trimmer. Hub/drum 305 is secured to shaft 310, and is designed to hold cutting string (e.g., by winding the string onto the hub/drum). Rather than removing hub/drum 305, screws (e.g., 317) are used to secure shaft adapter 141 directly to the hub/drum. Otherwise, this embodiment is similar to the embodiment shown in FIGS. 3A and 3B, in that a spindle 321 extends downward from mounting flange 316, and a threaded cap 341 is threaded onto the spindle to secure attachment 200 to the mounting flange.

As noted above, the web may have several advantages over simple strings. For instance, the web is easily replaced as a single unit—it can be snapped on or secured to the shaft adapter's mounting flange in various ways that are easier than winding string on a drum or inserting individual strings into a hub. Additionally, a cutting web provides many more cutting edges than conventional trimmers, which normally have one or two strings that serve as cutting edges. Further, as the cutting web wears down, additional cutting strings are generated when the disk wears down to the points at which the strings form junctions (as the junction wears through, the strings become free and act as individual cutters). Still further, the web is more easily seen in operation, which allows for a greater control of cutting. In other words, the greater number of strings form a more visible appearance of a disk, as compared to the single/dual strings of conventional trimmer heads which are nearly invisible, so that it is difficult to tell where the cutting edges of the strings end. The web may incorporate features such as circumferential strings (e.g., 215 in FIG. 2A) or colored regions (e.g., an outer annular region having one color and an inner annular region having a different color) to make the web even more visible and to allow the user to determine the amount of wear on the web when it is in use.

Since the cutting strings do not flex (due to the interconnections between the strings of the web), there is no line breakage from the string flexing during cutting operations. Consequently, it is not necessary to have a smooth curve on the shaft adapter for the string as in the prior art. Also, the interconnections between the strings of the web cause the strings to be held in a more outwardly extended position than strings in conventional trimmers (in which the strings extend outward more tangentially than radially outward), which may result in a greater cutting radius and corresponding higher speed at the ends of the strings. Since the strings of the web aren't wound around a drum, and since the strings do not rely on centrifugal force for bump and feed, the strings can be substantially thicker and thus more durable during cutting. The thicker strings are also more easily formed with specific cross-sectional shapes (e.g., they may have corners that produce a sharper cutting edge compared to round or smooth cross-sections), and the structure of the web will better maintain the orientation of the cutting edges (e.g., a sharper cutting edge will be held in a forward-facing direction). The cutting web can be made from any suitable method, such as injection molding the web, stamping or cutting the web from sheet materials, or weaving the web together from individual strings. The web can be made from any suitable material, such as plastic, metal sheet, metal cable/wires, or any combinations of materials.

Figure 4:
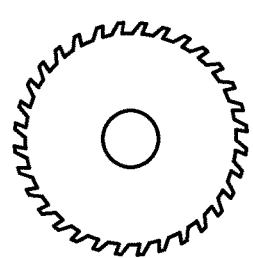
FIG. 4 is a diagram illustrating a sawtooth blade attachment for a multi-use tool in accordance with one embodiment.

As noted above, the cutting web is one of multiple attachments that can be mounted on the rotating shaft adapter of the tool. As an alternative to a web design, the cutting media can also have a solid body with teeth on the periphery, similar to a circular saw blade. This embodiment, depicted in FIG. 4, could be used to cut thicker stalks, brush, saplings, limbs, or twigs. This alternative would have a sawtooth-style blade, and can be made of various materials including, but not limited to plastics, metals, etc.

Figure 5:
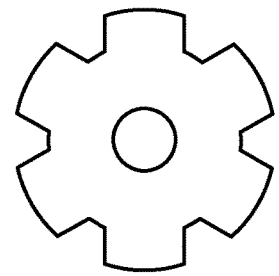
FIG. 5 is a diagram illustrating a straight bar type blade attachment for a multi-use tool in accordance with one embodiment.
Figure 6:
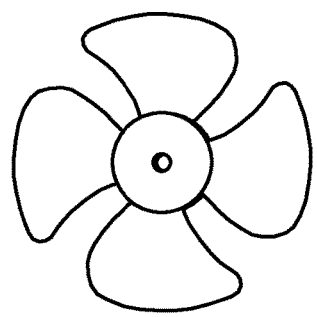
FIG. 6 is a diagram illustrating a fan blade attachment for a multi-use tool in accordance with one embodiment.

The tool could also use a straight bar style traditional blade as shown in FIG. 5, if needed. Another attachment is a fan blade as shown in FIG. 6. When this attachment is used, the tool acts like a lawn blower to blow leaves or clean off sidewalks and such after edging. The fan blade can shrouded or plain.

Figure 7:
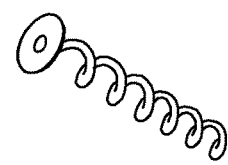
FIG. 7 is a diagram illustrating a weeder attachment for a multi-use tool in accordance with one embodiment.
Figure 8:
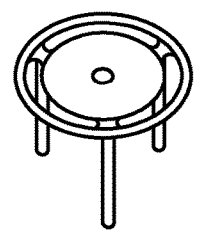
FIG. 8 is a diagram illustrating a tiller attachment for a multi-use tool in accordance with one embodiment.

Another embodiment is a helical weeder attachment that looks like a corkscrew. As shown in FIG. 7. The screw attachment would screw down into the weed center and, once it bottoms out (possibly against a stop such as a disk half way down), the screw would pull the weed out of the ground. When the attachment is pulled out of the ground, it is spinning, so the weed is "spun" out of the attachment. Yet another embodiment has one or more finger prongs that extend parallel to the axis of rotation of the shaft adapter and function like a tiller for soft dirt. This embodiment is depicted in FIG. 8. The tiller could be used to till the ground in flower beds or gardens.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A product comprising:
    an annular disk-shaped cutting web;
    wherein the cutting web has a center portion that is attachable to a rotating shaft adapter;
    wherein the cutting web has a plurality of cutting strings which are connected to the center portion and extend radially outward from the center portion;
    wherein the plurality of cutting strings intersect with each other at a plurality of junctions and are joined with each other at the junctions, thereby forming the disk-shaped cutting web;
    wherein when the disk-shaped cutting web is rotated, an outer portion of the plurality of cutting strings at a periphery of the disk-shaped cutting web perform a cutting function;

wherein when one of the junctions breaks, one or more of the plurality of strings that intersected at the unbroken junction form new cutting elements of the cutting web;

wherein the outer portion of the plurality of strings at the periphery of the disk-shaped cutting web comprise a plurality of arms, wherein each arm includes a plurality of the strings that are attached to the center portion at different points and that are joined together at a junction near the periphery of the cutting web.

2. The product of claim 1, wherein the center portion comprises a solid annular inner disk that is attachable to the rotating shaft adapter.

3. The product of claim 2, wherein the solid inner disk is annular, and has an aperture therethrough, wherein the disk-shaped cutting web is mountable on a spindle of the rotating shaft adapter by placing the spindle through the aperture of the annular disk.

4. The product of claim 1, wherein the plurality of strings comprise a plastic material.

5. The product of claim 1, wherein the center portion and the plurality of strings are integrally formed from a plastic material.

6. The product of claim 1, wherein the plurality of strings comprise metal wires.

7. The product of claim 1, wherein the center portion and the plurality of strings are integrally formed from sheet metal.

8. The product of claim 1, wherein one or more of the plurality of strings has a cross-section that includes a cutting edge which is substantially aligned with a plane of the disk-shaped cutting web.

9. The product of claim 1, wherein one or more of the plurality of strings has a cutting edge which is substantially aligned with a plane of the disk-shaped cutting web, wherein the cutting edge has a plurality of serrations.

10. The product of claim 9, wherein the serrations comprise teeth that are hooked toward the center of the disk-shaped cutting web.

11. The product of claim 1, wherein one or more of the plurality of strings has a leading cutting edge and a trailing cutting edge, wherein the leading cutting edge and the trailing cutting edge are substantially aligned with a plane of the disk-shaped cutting web.

12. The product of claim 1, wherein the plurality of strings are capable of flexing to positions outside a plane of the disk-shaped cutting web.

13. The product of claim 1, wherein the plurality of strings of the disk-shaped cutting web have two or more annular regions, wherein a first one of the two or more annular regions is configured to provide a corresponding first visual presentation when the disk-shaped cutting web is rotating, and wherein a second one of the two or more annular regions is configured to provide a corresponding second visual presentation when the disk-shaped cutting web is rotating, wherein the first visual presentation is visibly distinguishable by a user from the second visual presentation.

14. The product of claim 1, wherein each arm includes a plurality of the strings, each of which is attached to the center portion at a different point, wherein the plurality of the strings are joined together at a junction near the periphery of the cutting web.

15. The product of claim 1, wherein the cutting web further comprises a concentric ring that is attached to the plurality of arms, wherein the concentric ring is attached to each arm at a position that is intermediate to the center portion of the cutting web and the periphery of the cutting web.

16. An apparatus comprising:
a motor;
a rotating shaft coupled to the motor, wherein the motor drives the rotating shaft;
a shaft adapter coupled to the rotating shaft, wherein the rotating shaft drives the shaft adapter; and
an annular disk-shaped cutting web removably attached to the shaft adapter;
wherein the cutting web has a center portion that is attached to the shaft adapter, and has a plurality of strings which are connected to the center portion and extend radially outward from the center portion, wherein the plurality of strings intersect with each other at a plurality of junctions and are joined with each other at the junctions, thereby forming the disk-shaped cutting web;
wherein when the shaft adapter and the disk-shaped cutting web are rotated by the motor, an outer portion of the plurality of strings at a periphery of the disk-shaped cutting web perform a cutting function;
wherein when one of the junctions breaks, a plurality of strings that intersected at the unbroken junction form cutting elements of the cutting web;
wherein the outer portion of the plurality of strings at the periphery of the disk-shaped cutting web comprise a plurality of arms, wherein each arm includes a plurality of the strings that are attached to the center portion at different points and that are joined together at a junction near the periphery of the cutting web.

* * * * *